(No Model.)
J. T. HOWARD.
Cattle Cars.
No. 230,940.  Patented Aug. 10, 1880.
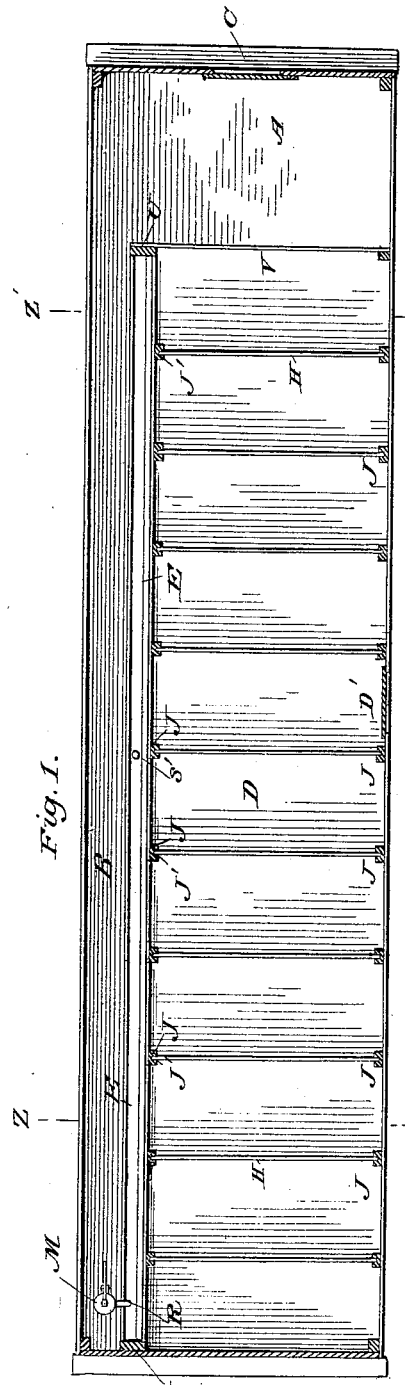
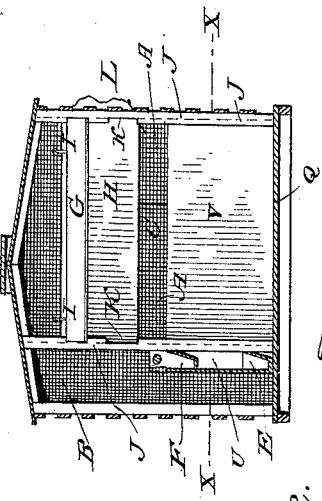
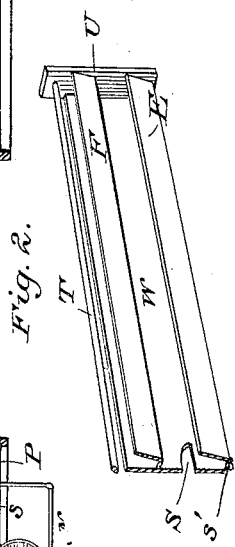
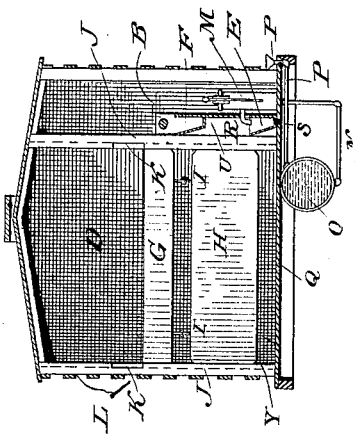
Attest:
R. F. Barnes.
F. Thomason
Inventor:
Joseph T. Howard

UNITED STATES PATENT OFFICE.

JOSEPH T. HOWARD, OF WASHINGTON, DISTRICT OF COLUMBIA.

CATTLE-CAR.

SPECIFICATION forming part of Letters Patent No. 230,940, dated August 10, 1880.

Application filed April 19, 1880. (No model.)

*To all whom it may concern:*

Be it known that I, JOSEPH THEOPHILUS HOWARD, M. D., of the city of Washington, District of Columbia, have invented a new and useful Improvement in Cattle-Cars, of which the following is a specification.

The object of the invention is to provide a more humane method whereby live animals of all kinds may be carried long distances without necessitating their removal from the cars for the purposes of resting, feeding, and watering them.

Heretofore in carrying cattle they have been crowded in cars without regard to the fact of its being essential to the health and welfare of such animals that they should have room enough for the free action of their lungs and muscles of respiration, that they should have sufficient space in which to lie down and get up again at will without injury to one another, and be fed and watered at least twice in twenty-four hours.

In the accompanying drawings, in which similar letters of reference indicate like parts, Figure 1 is a sectional plan view through the line *x*, Fig. 4; Fig. 2, a perspective of a portion of the feed and water troughs; Fig. 3, a transverse sectional elevation taken near the line *z*; and Fig. 4, the same near the line *z'*, Fig. 1.

A is a compartment at one end of the car, five feet wide, measuring from the door C to the partition V, while in its other dimensions it corresponds with the height and breadth of the car. Its use is for the storage of food. This compartment has a door at C, and is separated from the stall-compartment D by a partition, V, five feet high, which extends from the stall-frame U to the side of the car.

B is a passage-way leading from the store-room A, running the whole length of the car, the side of which forms its outer, while the troughs E F and bar T form its inner, bounds.

M is a pump located in that end of the passage-way B farthest from the storage-room A, which communicates with the water-trough E through the tube R, and with the water-tank O by the pipe N. By working the pump M water is drawn from the tank O through the pipe N and passed to the trough E through the tube R. This pump may be an ordinary one about four feet high, and made fast to the bottom of the car Q, which is pierced by the pipes N and P passing to and from the tank O.

The water-tank O has a capacity of seven barrels. It is furnished with a supply-pipe, P, having a funnel-shaped terminus at a point a little above the floor Q on the outside of the slats of the car, by means of which it can be readily put in communication with any of the water-stations commonly along railroads.

A portion of the tank O is indicated in Fig. 3, where it is seen in section. It is cylindrical in shape, and is made fast underneath the car by iron straps passing around it.

D is the compartment for animals. It is bounded by the troughs E F and the partition V on two sides, and by the walls of the car on the others. It is provided with a door, D', for the entrance and egress of stock. This compartment D is subdivided into eleven stalls, represented by the cross-lines H, Fig. 1. Each stall is seven feet nine inches in length and three feet in breadth, including the spaces occupied by the troughs E F, the partition V, and the standards J.

The stall-partitions are represented in Figs. 3 and 4, in which G H are two transverse pieces of the same length, but of different width, arranged parallel one above the other and joined together by the hinges I.

The hinges I are formed and attached to the partition-pieces G H, respectively, so as to allow a space of six inches to intervene between the latter. They are made of metal, pivoted as hinges usually are, with sharpened extremities, so as to be driven into the edges of the cross-pieces G H, or they may be flattened and formed like common strap-hinges, in which case they would have to be placed on that face of the partition-pieces G H which is adjacent to the vent R in the standards J.

The cross-piece G is one foot wide, and is placed above its fellow H, which is two feet wide. Both G and H move in a vertical plane in the grooves J', formed in the standard J, and made to receive them.

The slotted standards are arranged in two rows—an inner and an outer row—those of the former extending from the floor Q to a beam running lengthwise immediately beneath the roof of the car, and placed along in front of and fitted close into the troughs E F, thereby helping to maintain the latter in position, while those of the outer row are disposed along one side of the car, to which they are fastened and with which they correspond in height. Each standard has upon its inner edge a deep groove, J', for the reception of the partition-slides G and H. This groove terminates below at a point, Y, six inches from the floor Q, and has a vent at K, to admit one of the slides G to be passed in or out of the groove, as may be required. The standards J, comprising the outer row, are pierced at their upper fourth for the bolts L, which are inserted into the openings to maintain the partitions G H in their elevated position.

The bolts L are formed of metal of sufficient length and thickness for the purpose just described, and are kept in readiness for use by being suspended by a cord or chain from the side of the car.

Fig. 2 exhibits a portion of the troughs E F and the frame-work U W T supporting them.

E is the water-trough, F the feed-trough, each being one continuous cell. Both extend the whole length of the stall-compartment D, which is thirty-three feet, and with the frame-work U W T form the partition-wall between the stall-room D and the passage-way B.

The water-trough E is nine inches wide above and ten inches deep, tapering toward the lower part, where it is six inches broad. It rests upon the floor Q, through which an outlet, S', from the interior of the trough E, passes for the escape of stale water.

The trough E, by its position, is rendered practicable as a feed-trough for smaller animals. It should be made of metal.

The feed-trough F runs parallel with the water-trough E, is of the same dimensions, and is situated eighteen inches directly above the latter, and is composed of wood.

The frame-work into which the troughs are set is indicated by U W T. The end upright pieces, U, are five feet high. The piece U, situated in the store-room A, is narrower above the upper edge of the trough F than it is below it, to widen the passage-way B at that point.

The space W between the troughs E and F may be closed entirely, except leaving a vent at R for connecting the pump M with the trough E, and another at S to admit of the manipulation of the plug which closes the opening S from the passage-way B; or it may be merely slatted.

The operation of the device is as follows: The troughs E F and the partition V divide the interior of the car into a store-room, A, a passage-way, B, leading from the former, and a stall-compartment, D—the latter for the animals, the compartment A for the storage of such food as may be required for them, while the passage-way B affords a medium by which both food and water can be furnished to the occupants of compartment D at all times, the dimensions of compartment A being ample for the first-mentioned purpose, and the capacity of the water-tank O sufficient for the latter, which is easily obtained through the pump M, situated in the passage-way B.

Though the width of the passage B is but fifteen inches, it will be observed that the structure only reaches to the feed-trough F, above which it is wide enough for all practical purposes, as it is, indeed, below it, for the free use of the pedal extremities of a man in walking or turning. Both compartment A and passage B are accessible at all times through the door e.

The stall-compartment D consists of eleven stalls, hereinbefore described, for the accommodation of one animal each, such as the horse or ox, or they will afford separate pens for ten or twelve sheep or hogs.

The animals are passed in and out of the stall-division D through the door D' on one side of the car. This door D' is three feet wide, in which respect it is the same as one of the stalls.

I prefer having but one door for stock to go in and out of division D, as it will answer for all practicable purposes, though if it were necessary I could have a door in that side of the car at a point directly opposite the door D' by arranging that portion of the trough F between them so that it might be taken out for stock to pass through, which it could do by stepping over the trough E, while the bar T could be made to be taken out of the frame-supports U when required.

I am aware that stall-partitions have been before suggested for cattle-cars; but they are upon a plan entirely different from mine, already described and shown in Figs. 3 and 4, which are easily manipulated by one man inside of the car.

When the stock is to be admitted the partition-slides G H are raised till the former arrives opposite the vent K, where it is slipped out of the slot and brought down over its fellow H, when both together are urged to the top of the car and held there by the bolt L, as shown in Fig. 4, and the animals are allowed to pass under them.

The stock having been placed in the stall, the bolt L is withdrawn, the partition-pieces G H brought down till the former can be pushed into the slot through the vent K, when both pieces, G and H, are lowered together, as shown in Fig. 3, thus separating the cattle by a partition four feet high, with openings for ventilation at I' and Y.

Having thus described my invention, I claim as new and desire to secure by Letters Patent—

1. In a stock-car, the combination of a store-room, A, at one end of the car, and a passage-way, B, at one side thereof, with the stock-compartment D, divided by suitable partitions in the stalls for the reception of the cattle, as set forth.

2. In a stock-car, the combination of the feed and water troughs E F and the bar T with the sliding partitions G H and grooved posts J, arranged, in the manner shown and described, to form separate stalls for the cattle, as specified.

JOSEPH T. HOWARD.

Witnesses:
JOHN G. AULD,
FRANK A. CLARVOE.